United States Patent [19]

Plante

[11] 4,326,338
[45] Apr. 27, 1982

[54] AREA COMPARISON GAGE

[75] Inventor: Robert A. Plante, Irving, Mass.

[73] Assignee: The L.S. Starrett Company, Athol, Mass.

[21] Appl. No.: 185,682

[22] Filed: Sep. 10, 1980

[51] Int. Cl.³ .............................................. G01B 7/28
[52] U.S. Cl. .............................. 33/174 PA; 33/143 R; 33/174 E; 33/174 L; 33/DIG. 2
[58] Field of Search ............ 33/174 L, 143 L, 174 E, 33/174 PA, 178 E, DIG. 2, 174 P, 143 R

[56] References Cited

U.S. PATENT DOCUMENTS

| 2,691,827 | 10/1954 | Aller | 33/DIG. 2 |
| 4,024,646 | 5/1977 | Griggs | 33/174 P |
| 4,112,355 | 9/1978 | Gibson, Jr. et al. | 33/174 E |
| 4,139,947 | 2/1979 | Possati | 33/174 E |

FOREIGN PATENT DOCUMENTS 41018  7/1965  Fed. Rep. of Germany ... 33/174 PA

*Primary Examiner*—Willis Little
*Attorney, Agent, or Firm*—Kenway & Jenney

[57] ABSTRACT

A gage for directly measuring the deviation in cross sectional area of a passage from a nominal value employs a hydraulic system having pistons operatively engaged therewith. The pistons move in response to movement of passage contacting finger elements and the hydraulic system responds to piston movement to generate a measure of the passage area. At least one set of the finger elements has rotatable passage contacting members, each member having an elongated passage contacting surface. Each member rotates about a respective axis positioned to keep the center of each contact surface in a fixed position relative to the finger. Stop means are provided by fixed outboard finger elements, juxtaposed opposite movable finger elements, for providing improved stability for positioning the comparison gage.

11 Claims, 13 Drawing Figures

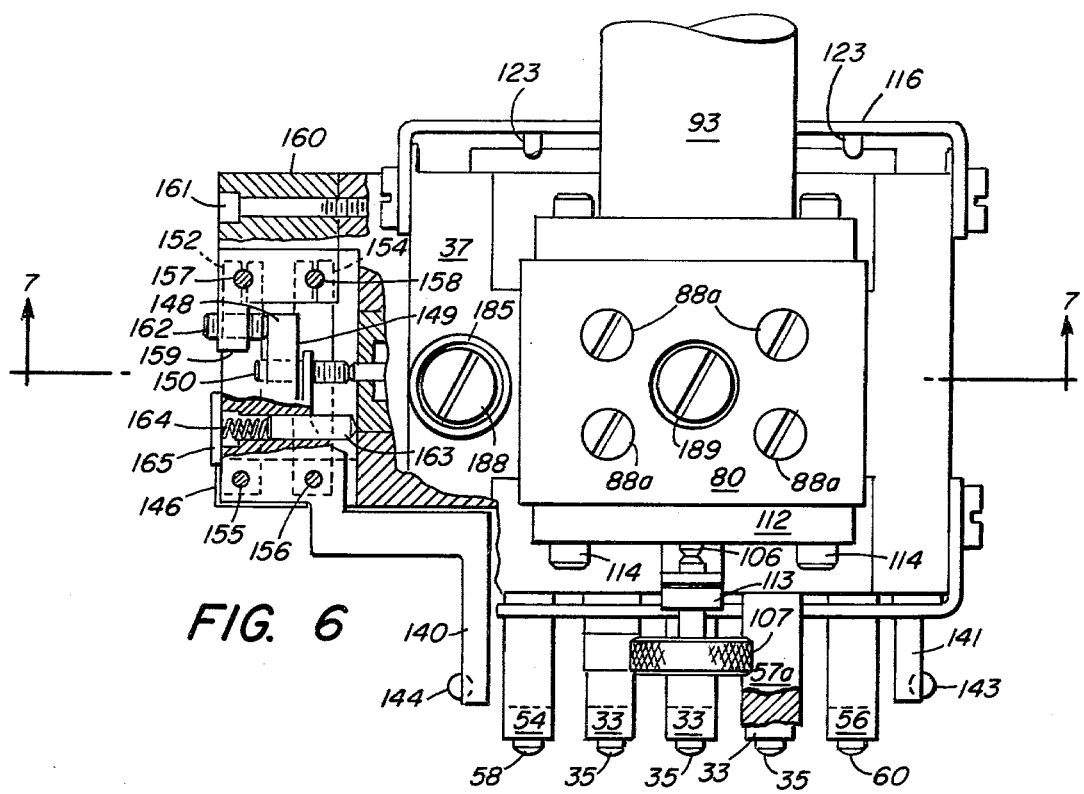
FIG. 6
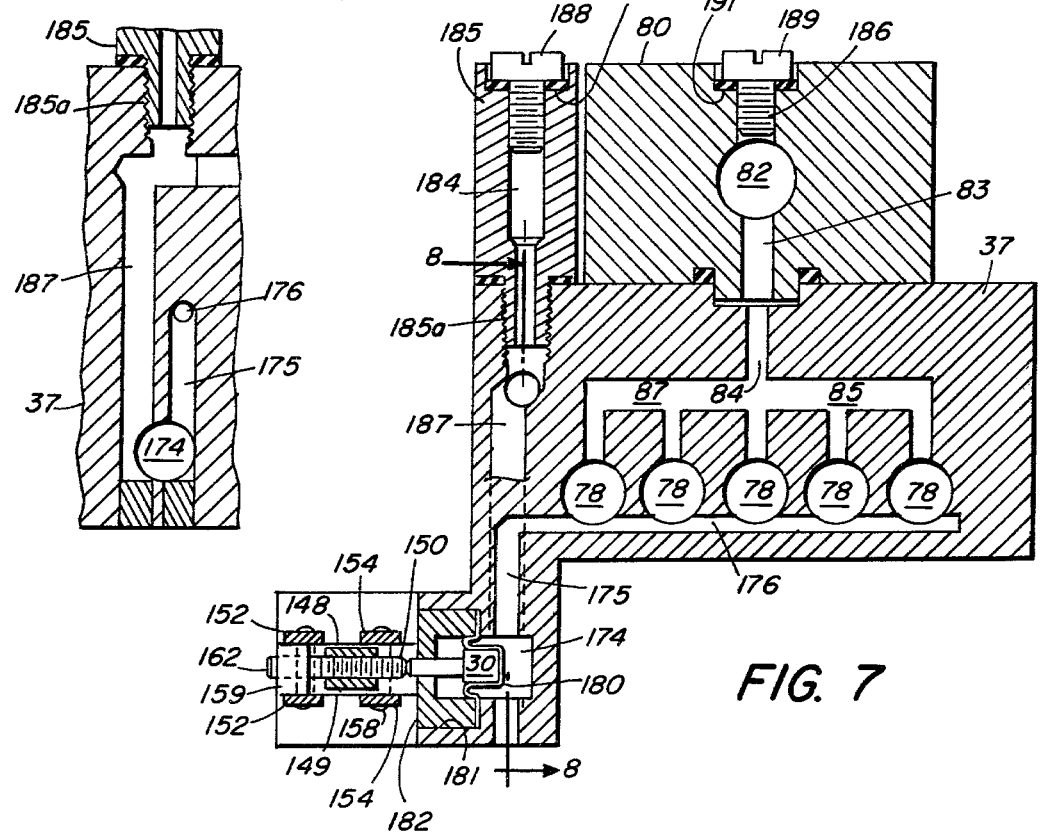
FIG. 8
FIG. 7

AREA COMPARISON GAGE

This invention relates generally to area measurement gages and in particular to an improved gage for measuring the area of a passage opening or recess relative to its fixed nominal value.

In the manufacture of articles having openings or passages, it is often desired to accurately measure the cross-sectional area of the opening relative to a specified nominal value without specific reference to the actual dimensions of the passage. To accomplish this result, there was developed the area comparison gage described in U.S. Pat. No. 3,115,711, assigned to the assignee of this invention, and whose disclosure is incorporated herein by reference. That gage provides extremely accurate measurement of the internal cross-sectional area of a passage or opening, relative to a nominal value, using hydraulic principles. The hydraulic measuring system provides a linear output signal accurately approximating the area being measured using "Simpson's Rule". The area measurement is the result of algebraically summing the fluid displacement of a plurality of sensor pistons which move in response to the deviations from nominal values of transverse linear dimensions of the area being measured.

The deviation from a preselected nominal value of the area can be important in, for example, an irregularly shaped passage such as the open area between adjacent vane airfoils used in a turbine engine.

While the gage described in U.S. Pat. No. 3,115,711 is commercially successful and accurate when used in connection with those vanes for which it was designed, there have now been developed new vane structures which employ air cooling and which require various modifications to the gage disclosed in the cited patent reference. These modifications require, instead of the substantially point contact as shown in the patent figures, a broad area contact to bridge the outlets which provide air cooling, so that inadvertent errors are not introduced if a measurement finger should become engaged in one of the depressions corresponding to the cooling air outlet.

The gage described in U.S. Pat. No. 3,115,711, when configured with a broad area contact surface, performs satisfactorily and consistently with vane airfoil structures of new manufacture. However, after the vanes are used in a turbine engine, the gage can provide erroneous area measurements if the vane airfoil trailing edge is severely distorted as a result of its constant exposure, under normal operating conditions, to a high velocity, high temperature gas flow.

It is therefore an object of this invention to provide an apparatus for measuring the area of a passage relative to a specified nominal value which can be employed with distorted areas such as "used", turbine engine air cooled vane structures. Other objects of the invention are an improved measurement gage which is accurate, reliable, repeatable, and easy to use. Further objects of the invention are an improved open area measurement gage having improved reference surface characteristics for further especially enhancing the reliability and repeatability of the measurements obtained using broad surface contacts on distorted surfaces.

SUMMARY OF THE INVENTION

The invention relates to a gage for directly measuring the deviation in the cross-sectional area of a passage from a nominal value. The gage has a housing for enclosing a hydraulic fluid chamber, at least a first and a second sensor pistons slidably received in the chamber for displacing fluids therein according to the algebraic sum of their individual displacements, and an output piston in fluid flow communication with the chamber for linear displacement in proportion to the displacement of the fluid within the chamber by the sensor pistons. The sensor pistons are arranged for linear displacement in response to deviations from nominal values of the respective dimensions of the passage along the measurement axes. The ratio of the cross-sectional areas of the respective pistons is at least equal approximately to the inverse ratio of the corresponding nominal dimensions of the passage along the measurement axes respectively. The gage further has a plurality of finger elements, and an assembly for supporting first and second groups of at least one each of the finger elements so that each movable finger element is in a driving relation with the first or second group of at least one each of the sensor pistons respectively. The first and second groups of finger elements are arranged to interiorally engage boundaries of the passage for substantially linear displacement along perpendicular first and second groups of parallel measurement axes, respectively.

At least one of the movable finger elements features a rotating section. Each rotating section is mounted for rotational movement about a section rotation axis substantially perpendicular to a measurement axis associated with the movable finger element. Each rotating section has an extended measurement surface aligned with and substantially intersecting the rotation axis, whereby a center point of the measurement surface is substantially stationary as the section rotates.

The rotation elements further feature a supporting, cylindrically arranged, shouldered element having arranged at a shouldered portion thereof, a transversely extending groove for receiving a measurement member therein. The measurement member defines the measurement surface and is a precision machined, rod element secured in the groove on the shouldered element.

In another aspect of the invention, the gage features a plurality of stop positioning elements arranged for engagement with the passage at a stable boundary thereof. The second group of finger elements then have finger pairs for engaging the passage along associated second group measurement axes at selected distances from the engaged boundary.

BRIEF DESCRIPTION OF THE DRAWINGS

Other objects, features and advantages of the invention will appear from the following description of a preferred embodiment of the invention taken together with the accompanying drawings in which:

FIG. 6 is a fragmentary view in top elevation;

FIG. 7 is a cross-sectional view taken along lines 7—7 in FIG. 6, looking in the direction of the arrows;

FIG. 8 is a cross-sectional view taken along lines 8—8 in FIG. 7, looking in the direction of the arrows;

DESCRIPTION OF A PREFERRED EMBODIMENT

Figure 1:
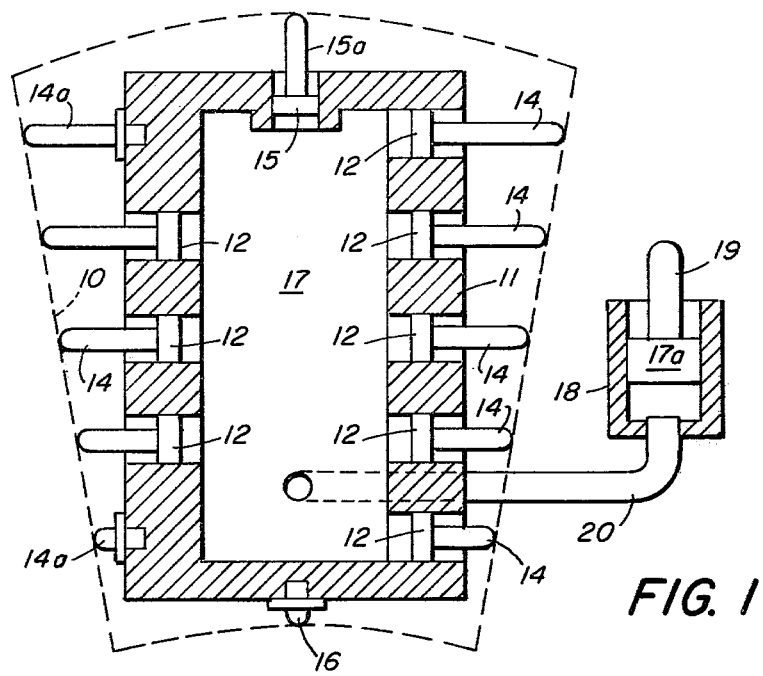
FIG. 1 is a schematic view of a simplified gage showing the hydraulic measuring system used in the preferred embodiment of the invention.
Figure 2:
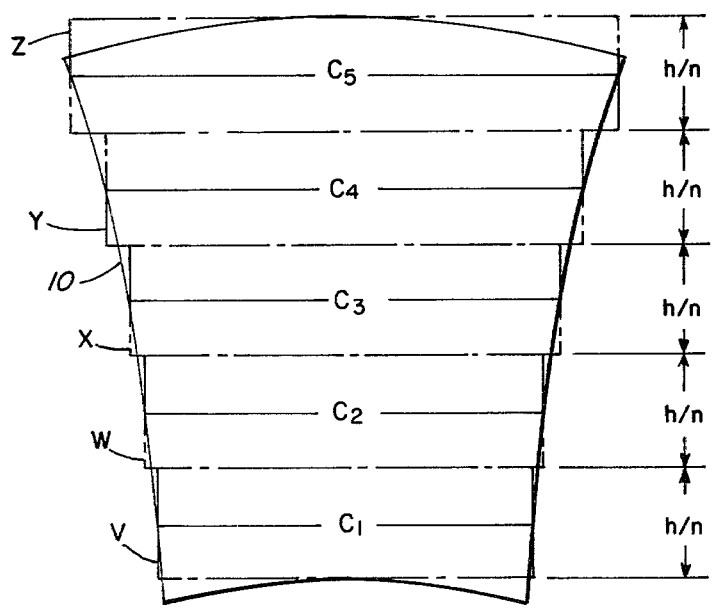
FIG. 2 is a schematic diagram of a representative irregular area, illustrating the measurements from which the system derives a cross-sectional area.

Referring to FIGS. 1 and 2, the improved gage utilizes the principles of approximation described in U.S. Pat. No. 3,115,711 to measure the area of a passage 10 of irregular form. The area is approximated by summing the areas of a series of imaginary rectangles shown in dotted lines at V, W, X, Y, and Z; which are of equal height in this example, and may be from any number affording a desired degree of accuracy. Each illustrated rectangle has dimensions, along normal axes, of h/n (n=5) and $C_1, C_2, \ldots C_5$. The area of the passage 10 is then equal to, approximately, $$\frac{h}{n} \sum_{n=1}^{5} C_n$$

This method of approximation is utilized in the illustrated gage by providing a closed hydraulic system including a chamber-forming housing 11 in which are slidably mounted a plurality of sensor pistons 12, having contacts 14 arranged to engage opposed longitudinally extending boundaries of the area 10 for displacement of the pistons along axes transverse to those boundaries. In the system shown, five sets of pistons 12 are provided on one side of the measurement housing and three sets of pistons are provided on the other side of the measurement housing. In addition, two sets of fixed contacts 14a are provided for positioning the measurement housing in the lateral direction. The contacts 14a can be, for example, press fit into the side of housing 11. These contacts 14, 14a correspond to the lateral dimensions $C_1, C_2, C_3, C_4, C_5$ in FIG. 2. For the measurement of the dimension h/n, a single sensor piston 15 is provided with a contact 15a for movement and engagement with one of the laterally extending boundaries of the area. A fixed contact 16 is press-fitted into the body of the housing 11, to afford a fixed longitudinal reference point for positioning the measurement housing in the passage 10, in the longitudinal direction. Any practical number of pistons 15 can be provided, as required, to secure a desired degree of accuracy. In the example shown, however, it is assumed that the laterally extending boundaries of the area are sufficiently planar to secure a desired degree of accuracy with a single measurement. Each of the pistons 12 and 15 communicate with a closed hydraulic fluid input chamber 17 formed in the housing 11, for algebraic summation of their linear movements by the displacement of fluid therein.

An output piston 17a is mounted in an output chamber 18 and is provided with a contact 19. A conduit 20 connects the piston 17a in fluid-flow communication with the chamber 17, for displacement of the contact 19 as a function of the algebraic sum of the fluid displacements of the sensor pistons 12 and 15.

As described in U.S. Pat. No. 3,115,711, if the areas of the pistons 12 and 15 bear a certain proportion, which is dependent upon the relationship between the nominal dimensions of a specific area to be measured, the displacement of the contact 19 is proportional to the deviation of the area from the specified nominal value. In practice, the contact 19 is drivingly connected with a linear-displacement indicator of any desired mechanical or electrical type, so that a direct reading of the deviation of passage area from the nominal value can be directly measured.

The ratio of the cross-sectional areas of each of the pistons(s) 15 to that of each piston 12 must be equal to the ratio of the sum of the measured lateral dimensions $C_n$ to the sum of the measured longitudinal dimensions h/n, to achieve the desired proportionality of the output signal to the deviation in cross-sectional area. In the case illustrated, a single longitudinal dimension is measured so that the required condition may be stated as follows:

$$\frac{r_{15}^2}{r_{12}^2} = \frac{\sum_1^n C_i}{h}$$

where $r_{15}$ represents the radius of a piston 15 and $r_{12}$ represents the radius of a piston 12.

This relationship can be derived as follows. Referring to the diagram of FIG. 2, the total derivitive of the area A may be expressed as:

$$dA = \frac{h}{n} \cdot \frac{\sum_1^n C_i}{h} dh + \sum_1^n dC$$

The total derivitive of the fluid displacement V can be written as:

$$dV = \frac{r_{15}^2}{r_{12}^2} dh + \sum_1^n dC_i$$

If the condition is established that:

$$\frac{r_{15}^2}{r_{12}^2} = \frac{\sum_1^n C_i}{h} \ .$$

then the relationship between the deviation is displacement and the deviation in measured area is a constant:

$$\frac{dV}{dA} = \frac{r_{15}^2}{h/n}$$

That is, the deviation in area is proportional to the volume of fluid displaced in the system, and is expressed as the linear displacement of the output piston 17a. This result is not dependent upon there being a particular number of sensor pistons for the measurement of either the lateral or longitudinal dimension, provided only that the previously-stated relationship between the cross-sectional areas of the individual pistons of the two groups is established. Furthermore, the system is applicable to the measurement of both regular and irregular areas of all forms, although a greater number of sensor pistons may be necessary to obtain more satisfactorily accurate measurement of highly irregular areas.

As disclosed in U.S. Pat. No.3,115,711, in many applications, it is not practical to provide a system of the type shown in FIG. 1 with boundary-engaging contacts directly affixed to the sensor pistons, since the area to be measured is not large enough to receive the apparatus. One such application, in which the invention has particular utility, is the measurement of the flow areas between the adjacent partitions (or vane airfoils) of a turbine nozzle diaphragm. Referring now to FIGS. 3-11, a preferred embodiment of the invention incorporates additional features for adapting the apparatus of U.S. Pat. No. 3,115,711 to the measurement of such flow areas, particularly distorted, air cooled vane airfoils.

Figure 3:
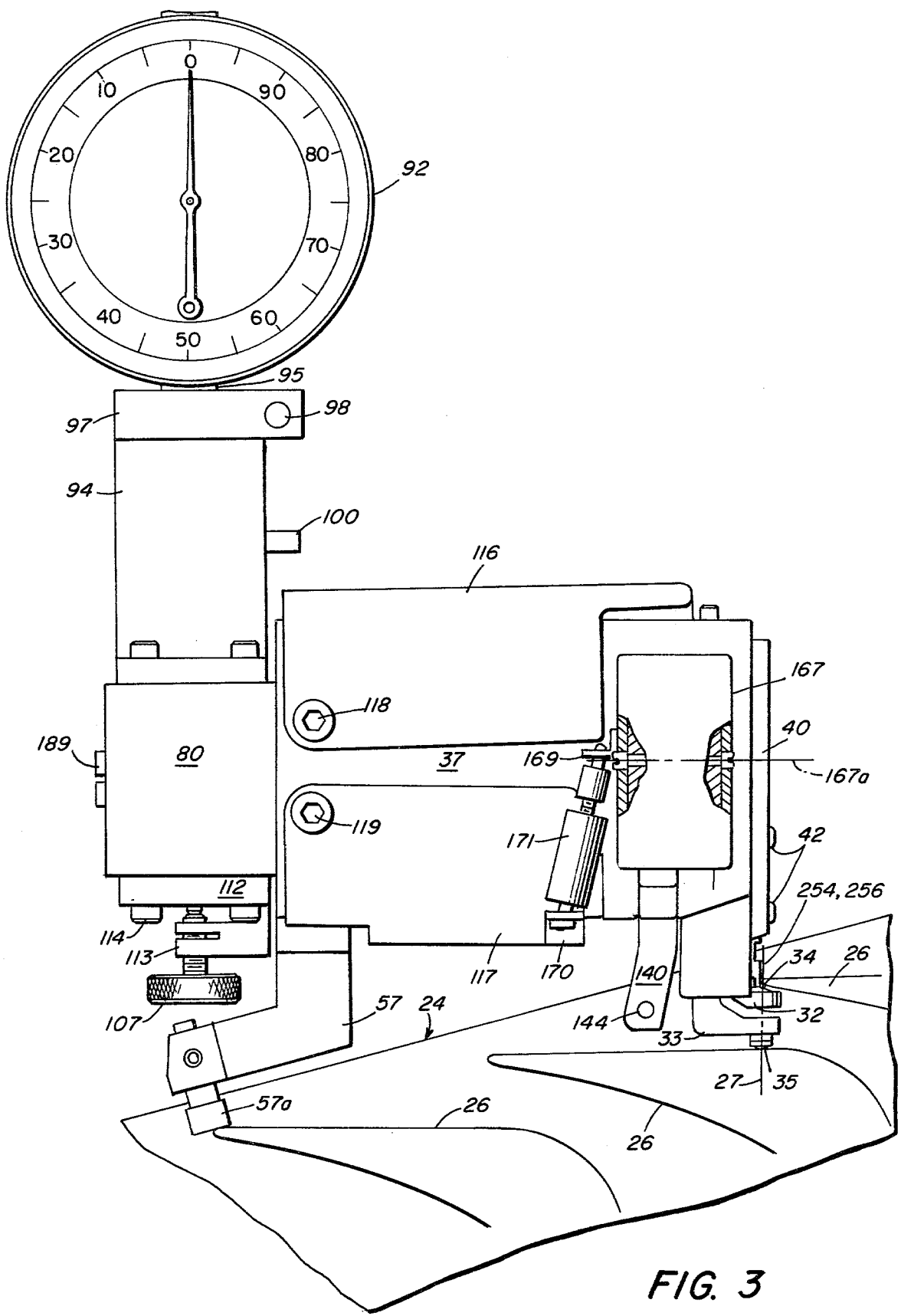
FIG. 3 is a side elevation of the preferred embodiment of the invention particularly adapted for measuring flow areas between partitions of a turbine nozzle diaphragm.

Referring to FIG. 3, an illustrated turbine nozzle diaphragm generally designated 24 includes an outer annular band 25, a concentric annular internal band (not shown), and a plurality of radial partitions 26, typically called the vane air-foils, circumferentially spaced about the bands and extending radially therebetween. It is desired to measure the flow area between adjacent partitions at a plane generally designated 27.

Figure 5:
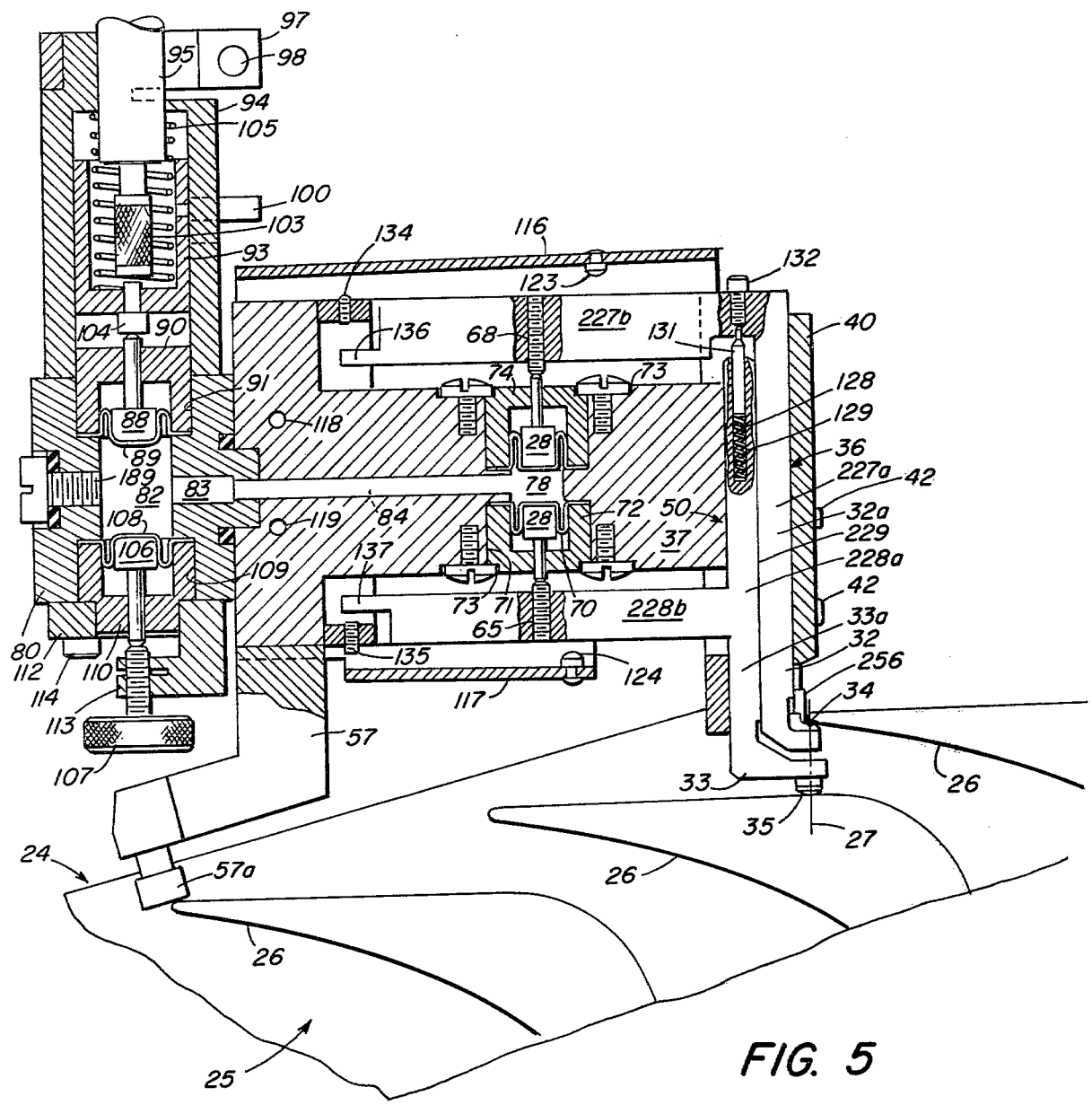
FIG. 5 is a cross-sectional view taken along lines 5—5 of FIG. 4.
Figure 9:
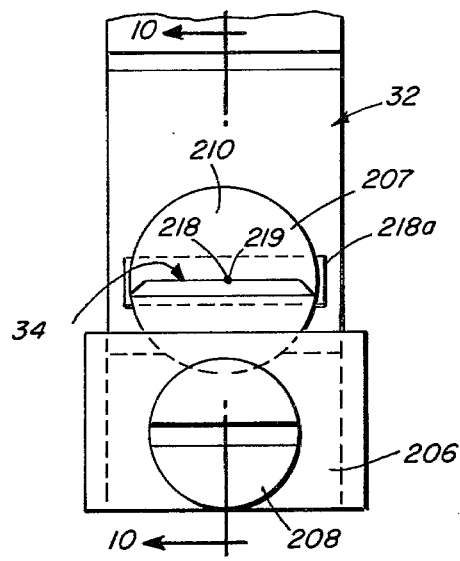
FIG. 9 is an end elevational view of an upper contact according to the invention.
Figure 10:
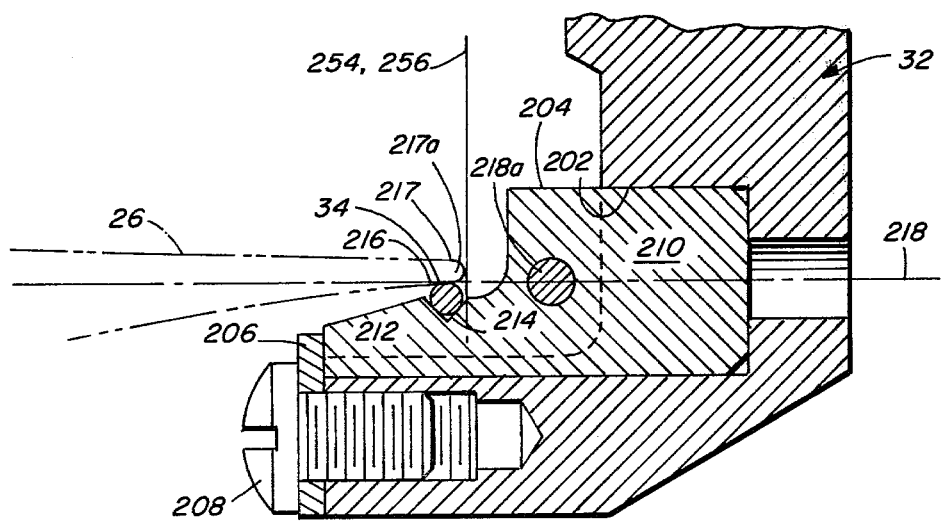
FIG. 10 is a cross-sectional view along lines 10—10 of FIG. 9.

Referring to FIG. 5, a plurality of sensor pistons 28 are provided for measuring the chordal dimensions of the flow area along five measurements axes radially spaced along the longitudinal span of the partitions. A single sensor piston 30 (FIG. 7) is provided for measuring the radial height longitudinal dimension between the inner and outer bands of the diaphragm. The sensor pistons, however, do not directly contact the boundaries of the nozzle area, but are arranged to be displaced in response to the movements of a plurality of movable upper fingers 32 and lower fingers 33, adapted to that purpose. The fingers include sliding extensions 32a, 33a for linear movement, to accurately transfer, by a linear response, the measured deviations of the area boundary to the sensor pistons. Thus, each of pistons 28 is operatively associated with and responsive to a respective finger 32, 33, having contacts 34, 35 for engaging the adjacent partitions defining the lateral boundaries of the opening along the plane 27. Axes passing through the centers of contacts 34, 35 define a plurality of measurement axes in the plane 27.

Each movable finger 32, 33 is mounted within a slot 36 formed in a housing member 37, and is adapted to slide linearly in the respective slot. The fingers are maintained in the slots by a cover plate 40 secured by screws 42. The slots 36 thus guide the fingers 32 and 33 in parallel movement in response to the displacement of the contacts 34 and 35, respectively, by their engagement with the boundaries of the nozzle passage, that is, the partitions.

The gage is positioned at a desired position with respect to the nozzle diaphragm, for engagement of the contacts 34, 35 with the partitions along plane 27, by means of fixed lower reference fingers 54, 56 (FIG. 4) in combination with an arm 57, bearing a foot 57a for engagement with the trailing edge of an adjacent partition (FIG. 3). Arm 57 is affixed to the housing member 37 by any suitable means. Fixed reference fingers 54, 56 have contacts 58, 60 which bear upon the relatively thick, upper convex surface of a lower partition 26 of the area being measured.

Referring to FIG. 5, the hydraulic system operates as follows. The pistons 28 are mounted in flexible diaphragms 70, which are received in respective recesses 71 formed in the housing member 37 and secured about peripheral portions thereof by mating inserts 72 fastened in the recesses at a shouldered periphery 73 by machine screws 74. The diaphragms 70 are of a well-known type adapted to produce a fluid displacement, in a series of input chambers 78 (see FIG. 7) formed within the housing member, proportional to the linear displacement of the pistons by the fingers 32 and 33. A second housing member 80 has an output fluid chamber 82 which communicates with the input chambers 78 through a passage 83 formed in the housing member 80, and a passage 84 and branch passages 85, 86, 87, 87a, and 87b formed in the housing member 37 (FIG. 7). The housing members are integrally secured in a fluid-tight relationship by a plurality of machine screws 88a (FIG. 6).

Figure 4:
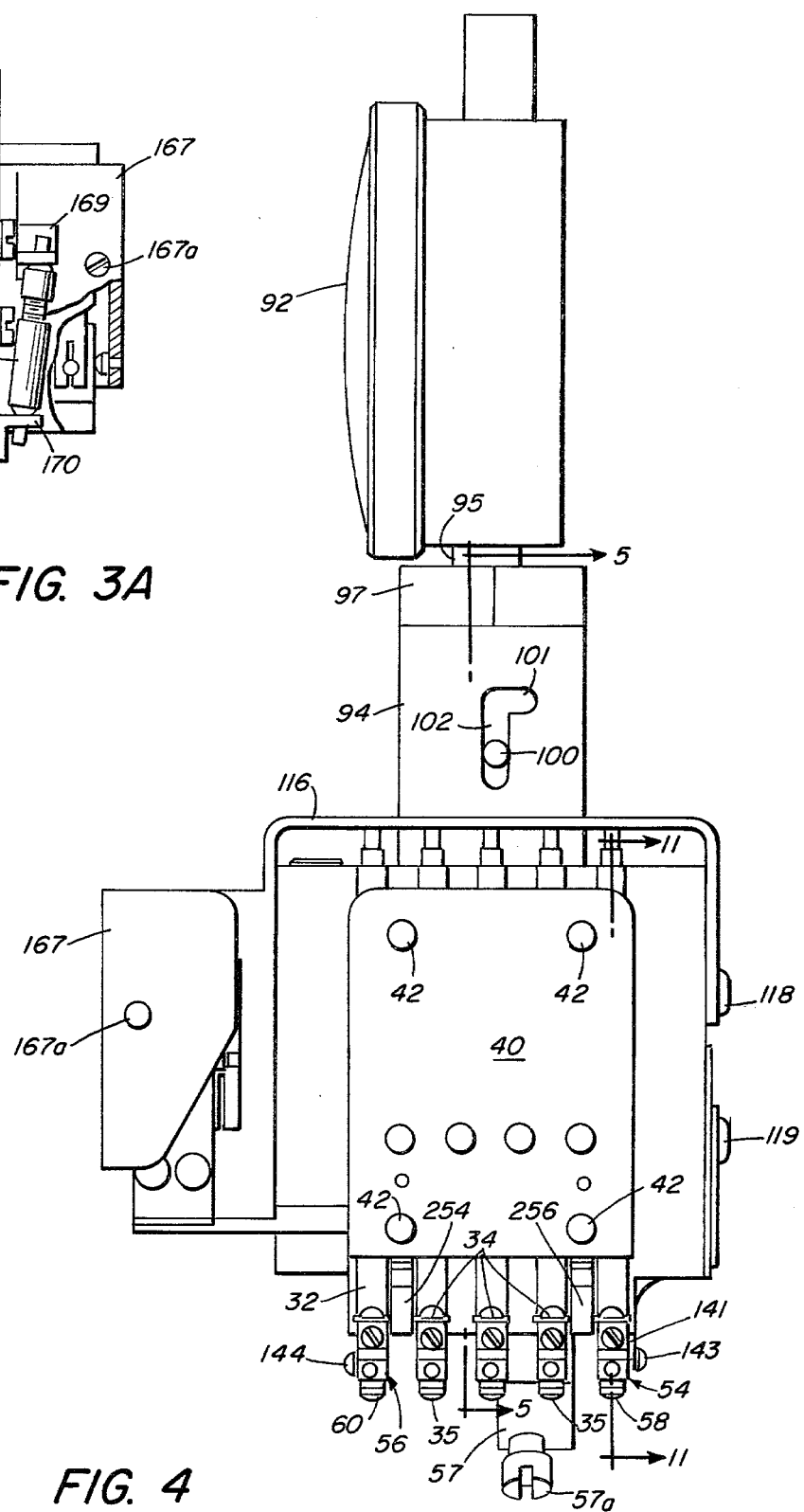
FIG. 4 is a front elevation of the gage of FIG. 3.

The displacement of the sensor pistons 28 is transmitted by the hydraulic fluid enclosed in the housing to an output piston 88 received in the chamber 82, and mounted in a flexible diaphragm 89 whose periphery is secured by means of an insert 90 in a mating recess 91 formed in the housing member 80. In the illustrated embodiment, the displacement of the output piston 88 is transmitted to a linear displacement indicator 92 of any suitable type, by a spring retainer 93 slidably received in a further housing member 94. A neck portion 95 of the indicator is secured in the housing member by means of a split collar 97 formed therein, and is secured by a clamping screw 98. When the gage is not in use, the spring retainer 93 may be locked in a position disengaged from the piston 88 by means of a stud 100 threaded in the retainer, by manually sliding and the stud into the transverse leg 101 of an L-shaped slot 102 formed in the housing member (FIG. 4). This disengagement prevents a permanent "set" from being imparted to any of the diaphragms in the hydraulic system. The stud is shown positioned in the longitudinally-extending portion of the slot 102 to permit movement of an actuating spindle 103 of the indicator by the piston 88, through a hardened anvil 104 press-fit into the retainer 93. A compression spring 105 is interposed between the housing and the retainer to "preload" the hydraulic system in compression for improved accuracy of initial response.

A calibrating piston 106 is positioned in the chamber 82 for adjustment by a calibrating screw 107, so that the indicator may be "zeroed" by placing the gage upon a master block set to the nominal longitudinal (radial height) and lateral (chordal) dimensions of the nozzle passage area to be measured. The calibrating piston is provided with a flexible diaphragm 108, which is peripherally sealed in a recess 109 of the housing member 80 by an insert 110. A ring member 112 bears a split lug 113 into which the calibrating screw is threaded, and this member is secured on the housing by a plurality of machine screws 114.

To permit the contacts 34 and 35 to be inserted between the nozzle partitions without interference, retractors 116, 117 are pivotally mounted upon the housing member 37 by means of pivotal connections 118, 119, respectively. At their free ends, each retractor is provided with a plurality of riveted studs 123, 124 for engagement with respective corresponding ones of the fingers 32, 33, for manually effected biasing of the contacts 34 toward the contacts 35.

The contacts 34, 35 are biased into engagement with the partitions 26 upon release of the retractors. As noted above, a compressional "preload" is applied by the hydraulic system and this "preload" is aided by a plurality of compression springs 128, each received within a bore 129 formed in a corresponding movable finger 33 or fixed finger 54, 56. Each of the springs urges a stud 131 into engagement with a corresponding juxtaposed finger 33 at a threaded member 132 to bias the fingers 32 in a direction away from fingers 33, 54 and 56. Thus, the fingers can be inserted between the nozzle partitions by manually depressing the retractors 116, 117; and upon the release of the retractors, the movable contacts resiliently engge the partition opposing surfaces. Outer limit elements 134, 135, here threaded adjustment screws, engage extensions 136, 137 of the finger elements to limit outward travel under the spring assisted, hydraulic "preload".

The radial height dimension of the nozzle passage is measured using, in the illustrated embodiment, a single pair of fingers 140 and 141 (FIG. 6). The illustrated finger 141 bears a contact 143 and is fixed to the housing to provide a reference location for the gage; and the deviation in the radial height dimension from the nominal value is measured by the sensor piston 30 in response to the movement of a contact 144 mounted on the movable finger 140. Contacts 143, 144 engage the radial passage surfaces along respective measurement axes. These axes may be either coaxial or offset. The movable finger extends between a pair of upstanding parallel lugs 146 formed in the housing member 37, and is formed with a lug 148 split at 149, in which is threaded a stud 150 for engaging the end of the piston. Two pairs of links 152 and 154 form a parallelogram linkage pivotally supporting the finger in the housing for substantially linear movement, affording a linear response of the piston to movement of the contact 144. The links are pivoted to the finger at 155 and 156, respectively, and at 157 and 158 to a lug 159 which extends from an upstanding member 160, secured to the housing by screws 161. The contact is thus arranged to drive the piston 30 (FIG. 7) to transmit the deviation in the radial height dimension thereto. A stud 162 is threaded through the lug 159 to limit the movement of the finger 140 outwardly with respect to the housing. A stud 163 is slidably received in the finger, is biased against the housing by a compression spring 164 which is received in a bore 165 capped by an end plate 166 secured to the housing, to urge the finger outwardly of the gage. A retractor 167 is pivotably mounted at a pivot 167a and has a rivoted stud 168 which bears against the finger 140 for automatic depression of the contact 144, when retractor 117 is depressed to facilitate its insertion into a turbine nozzle passage.

Figure 3A:
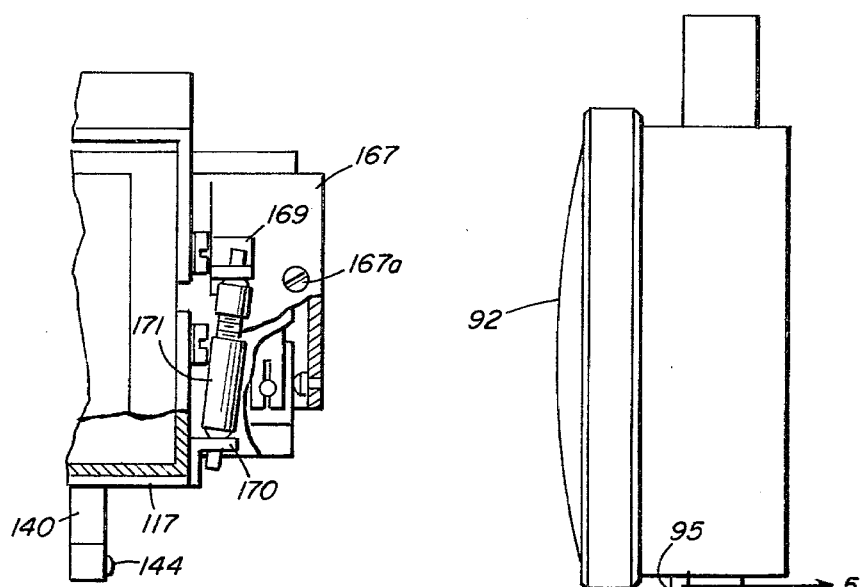
FIG. 3A is a fragmentary view of the automatic radial retractor assembly.

Referring to FIGS. 3 and 3A, the illustrated radial retractor 167 carries a bracket 169 silver soldered thereto. Similarly, retractor 117 carries a bracket 170. Mounted between the two brackets 169, 170 is an adjustable push rod 171. In operation, when retractor 117 is depressed, a pivotal force is established at the bracket 169 causing retractor 167 to pivot about pivot 167a thereby forcing finger element 140 to move toward finger element 141. Upon release of retractor 117, the finger element 140 moves away from element 141; and the elements are urged against the radial bands 25.

As best shown in FIG. 7, the radial height piston 30 communicates with the input chambers 78, and therefore with the output chamber 82, through an input chamber 174, a passage 175, and a branch passage 176, all formed in the housing member 37. The piston 30 is provided with a flexible diaphragm 180, which is peripherally seated in a recess 181 and retained therein by means of an insert 182.

For filling the enclosed chambers of the gage with a suitable hydraulic fluid, an inlet passage 184 is formed in a housing member 185, communicating with the passage 175 through the chamber 174 and a passage 187 (FIG. 8). The member 185 is threaded into the housing at 185a. An air release port 186 is formed in the housing member 80 in communication with the chamber 82, for allowing the escape of any entrapped air from the system during filling. Extending the passage 187 to the chamber 174, rather than joining it directly to the passage 175, insures that no air will be entrapped in the lower part of the system. When not in use, the ports 184 and 185 are sealed by screws 188 and 189, respectively, threadedly engaged therein and seated against O-rings 190, 191, respectively.

Figure 4A:
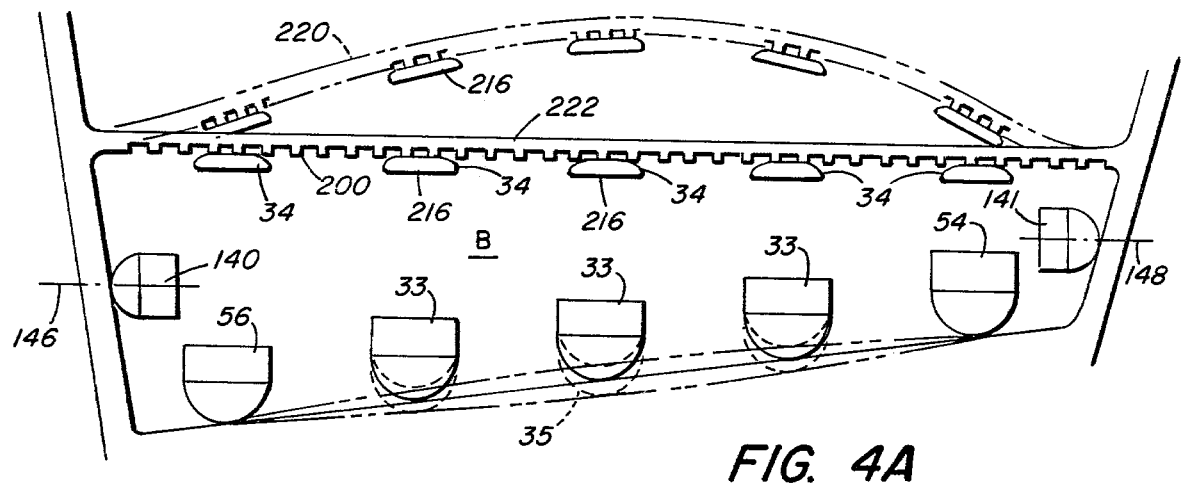
FIG. 4A is a diagrammatic representation of the measurement of a distorted vane airfoil.

Referring now to FIG. 4A, each of the passage contacting members 34 extends in the longitudinal direction to provide a relatively long contact surface in engagement with the illustrated interior B of the passage being measured. This relatively long contact surface enables the contact members 34 to bridge the ribs 200 which are typical of the air cooled vanes found in many turbine engines.

The structure of the upper fingers 32 at contacts 34 are all substantially identical. Each upper finger, referring to FIGS. 9 and 10, has a circular bore 202 drilled therein, into which is inserted circular cylindrical, shouldered member 204. This member is supported in bore 202 in a relatively loose, rotating fit and is captured in the bore 202 by a small plate member 206 secured to finger 32 by a threaded screw 208.

Rotatable member 204 has a first cylindrical section 210 and a second relatively flat shouldered section 212 having a V-shaped cut 214 machined therein. A precision rod element 216, preferably tungsten carbide, is secured, preferably by silver soldering, within cut 214 so that its uppermost surface 217, which contacts the trailing edge 217a (concave side) of the vane airfoil, is aligned with the rotation axis 218 of the cylinder portion 210 of rotating member 204. Rotating shouldered member 204 is thus free to rotate, to a limited extent, about the axis 210 under the action of forces bearing upon the precision surface 217 of rod 216; however the center 219 of the upper surface 217 remains in substantially stationary alignment with axis 218 as the shouldered member 204 rotates. The rotation of member 204 is however limited by a pin 218a which extends through cylinder portion 210 and is secured therein.

Thus, referring to FIG. 4A, when the improved gage is employed to measure a severly distorted vane, such as that indicated by reference number 220, that is, a vane which differs significantly from a standard new vane, the shape of which is designated by reference 222, the rod elements 216 will pivot about the axes 218 as they contact the surface of the vane. This surface is the trailing edge surface of the vane. There results a good fit and an accurate measurement. Importantly, the central contact point 219 of surface 217, as the rod element and member 204 rotate, does not move, thus assuring an accurate, reliable and repeatable measurement.

As shown in FIG. 4, and as noted above, the illustrated embodiment has five upper, trailing blade contacting, measuring fingers 32 which each connect with a respective piston element 28. Opposite each of these upper measuring fingers, there is provided a corresponding lower finger member. The contact elements 35, 58, and 60 of these lower finger members are each of a more conventional type and each has a generally rounded contact surface for substantially point contact with the "bottom" of the passage being measured.

In the illustrated embodiment, this bottom surface is the upper surface at the heavier (thicker) portion of the vane airfoil, and is generally not distorted substantially by the hot gases passing thereby. Further, this convex surface does not have the ribbed cooling structure of the trailing edge. Therefore, a substantially point contact is acceptable.

As noted above, the fixed lower fingers 54 and 56 have a known vertical position relative to, for example, housing 37 and provide the vertical reference surfaces for this measurement system. These fingers 54 and 56 are spaced fixed, known vertical distances below the nominal contact point of the radial or longitudinal contact surfaces 143, 144. The distances can be equal or, as illustrated, unequal. FIG. 4A illustrates the movement of the middle three fingers 33 relative to fixed fingers 54, 56. Note that the radial or longitudinal measurement axes 146, 148 are at fixed vertical distances relative to contacts 58, 60. This is important when the radial boundaries are not parallel (as in FIG. 4A) since it provides, in combination with fixed reference fingers 54, 56, a radial measurement location which does not vary even if the trailing vane edge is severely distorted.

Referring to FIG. 5, which shows a typical cross-sectional view along a plane passing through two oppositely movable fingers, each finger 32 sliding extension 32a has a vertically upward extension 227a and a horizontal extension 227b integral therewith. Similarly, each movable finger 33 sliding extension 33a has a vertically upward extension 228a and a horizontal extension 228b integral therewith. The vertical extensions 227a and 228a are in opposed sliding contact along interface 229 and slide freely in the precision, machined slots 36 provided therefor. Preferably, at least the surfaces in sliding contact are highly polished and are electroless nickel plated.

Figure 11:
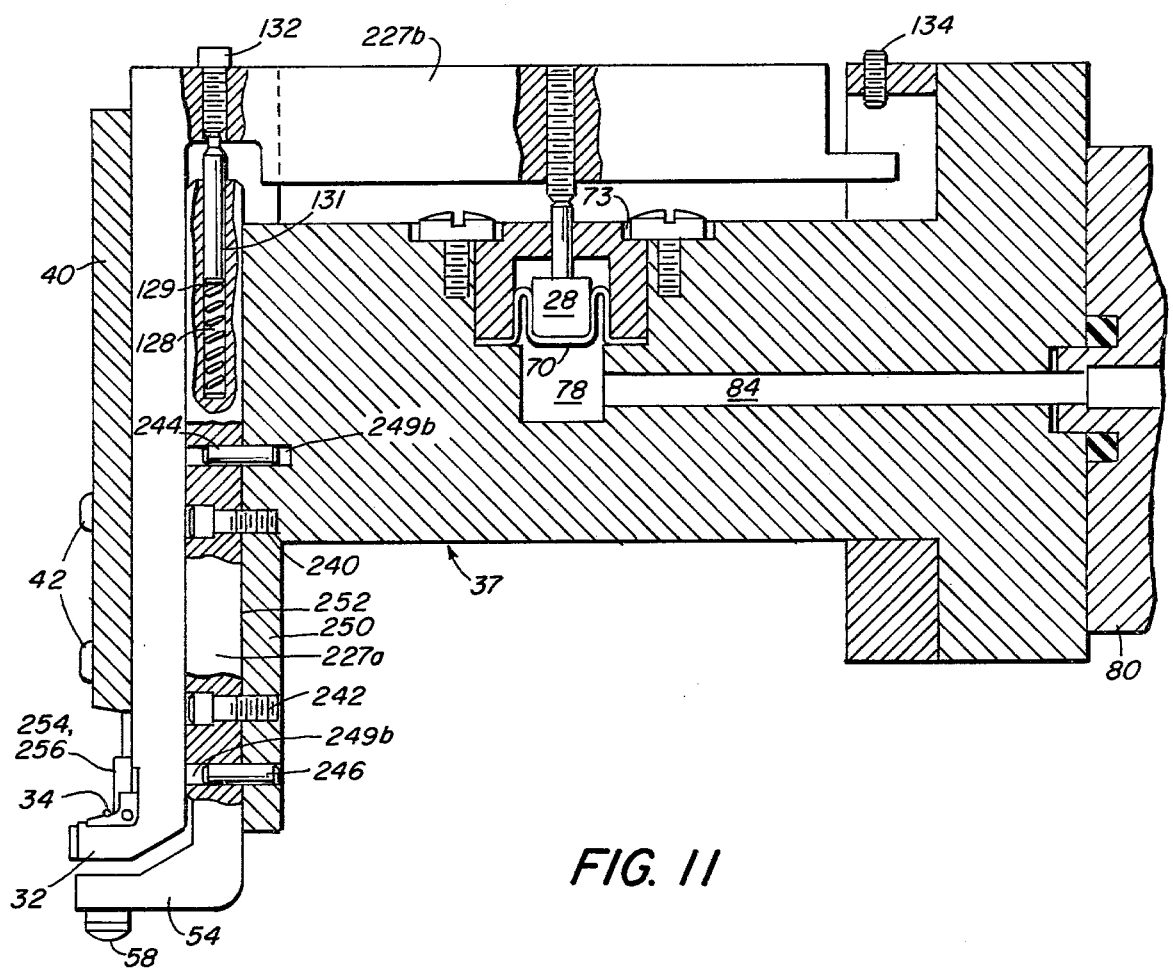
FIG. 11 is a cross-sectional view taken along lines 11—11 in FIG. 4.

Referring now to FIG. 11, the structure of the outer sets of fingers 32, 54 and 32, 56 is similar to the structure of two opposed movable fingers. The fixed finger 54 (or 56) is secured in position by screws 240, 242 and is accurately held in position by precision pin alignment members 224, 246 in bores 249a, 249b, respectively. The finger 32 opposite a fixed finger, like all fingers 32, has the vertically upward extension 227a and the horizontal extension 227b integral therewith. Extension 227a is in sliding contact with a fixed upward vertical extension 250 of finger 54, which is pinned as noted above by pins 244, 246, and which is secured to housing 37, as noted above by screws 240, 242. The sliding interface 252 between the vertical extensions 227a, 250 is prepared, as described above, for smooth sliding contact. Contact 34 is biased away from contact 58 of finger 54 by the spring 128 in bore 129 as it biases against a rod 131 in contact with threaded member 132. Since the finger 54 (and 56) is fixed, it is not connected to a piston and does not affect the fluid displacement in the hydraulic chamber 78. However, as described above in connection with other movable fingers 32, the movable fingers 32, which are positioned opposite the fixed fingers, are movable in operative relation to a piston 28 and its movement effects fluid displacement in the fluid chamber.

The vane trailing edge is located, in a direction transverse to contact surfaces 217, by precision locating surfaces 254, 256 which, referring to FIG. 11, abut and align the trailing edge of the vane air foil. Surfaces 254, 256 are positioned on the housing 37 in the gaps between fingers 32.

It will be seen that the gage forms an enclosed hydraulic chamber in which the output piston is displaced in proportion to the algebraic sum of the fluid displacements of the chordal and radial height sensor pistons, and that these pistons are responsive to the deviations of the corresponding measured dimensions from their nominal values.

In the use of the gage for the measurement of flow areas, the gage is first calibrated to a nominal value; for example by engaging the contacts of the various sensors upon a master gage block incorporating the nominal area, and adjusting the indicator to a zero reading. The fingers are then inserted into the passage which it is desired to measure. The deviation in area is registered directly on the indicator, and, provided that the calibrations of the indicator dial are arranged for this purpose, can be, for example, square inches. However, since the deviation in area is directly proportional to the linear displacement registered by the gage, a standard dial indicator calibrated for linear measurement may be used, together with a table correlating the registered linear displacements with deviations in area.

It will be understood from the previous description of the embodiment of FIG. 1 that the ratio of the cross-sectional area of each sensor piston 28 to that of the piston 30 is to be equal to the ratio existing between the nominal radial height and the sum of the nominal chordal dimensions to be measured. In the illustrated embodiment, a single piston is employed for measurement of the radial height and the extreme chordal positions, while a pair of pistons is used for the measurement of each intermediate chordal dimension. This arrangement facilitates placement of the contacts by conveniently establishing a reference location for the gage within the boundaries of the area being measured. However, it will be apparent that a pair of movable pistons can be used to measure each dimension along either of the sets of measurement axes; and in lieu of using one movable piston and one fixed contact for any one of the measurement, all contacts can be made movable. A different position referencing arrangement must then be employed. The areas of each of the sensor pistons should be selected according to the relationship previously stated, whichever arrangement is used, that is, the area of the individual pistons is the same in either case.

Additions, subtractions, deletions, and other modifications of the illustrated embodiment will be obvious to those practiced in the art, and are within the scope of the following claims.

What is claimed is:

1. In a comparison gage for directly measuring the deviation in cross-sectional area of a passage from a nominal value, the gage having means for forming an enclosed hydraulic fluid chamber, at least a first and a second sensor piston slidably received in said chamber for displacing fluids therein according to the algebraic sum of the individual displacement of said pistons, said sensor pistons arranged for linear displacement in response to deviations from nominal values of respective dimensions of said passage along measurement axes, the ratio of the cross-sectional areas of said respsective pistons being at least approximately equal to the inverse ratio of corresponding nominal dimensions of said passage along said measurement axes respectively, an output piston in fluid flow communication with said chamber for linear displacement in proportion to the displacement of fluid by said sensor pistons, a plurality of finger means, at least one finger means being movable along each of said measurement axes, means for supporting first and second groups of at least one each of said finger means so that each movable finger means is in driving relation with first and second groups of at least one each of said sensor pistons respectively, and said first and second groups of finger means being arranged to interiorly engage boundaries of a passage for substantially linear displacement along substantially prependicular first and second groups of parallel measurement axes respectively, wherein the improvement comprises at least one movable finger means of said first group of finger means comprising a rotating section, said rotating section being mounted for rotational movement about a section rotation axis substantially perpendicular to a measurement axis associated with said movable finger means, and each said rotating section has an extended measurement surface, said measurement surface aligned with and substantially intersecting said section rotation axis, whereby a center point of said measurement surface is substantially stationary as said section rotates.

2. The gage of claim 1 wherein said improvement further comprises a plurality of stop positioning means, said stop means arranged for engagement with said passage at a stable, surface boundary of said passage.

3. The gage of claim 2 wherein the stop positioning means is a fixed finger element arranged in juxtaposition to a movable finger means.

4. The gage of claim 1 wherein each said rotating section comprises a measurement member, a supporting, cylindrically arranged, shouldered element, said shouldered element having arranged at a shouldered portion thereof a transversely extending groove for receiving said measurement member therein, and the measurement member comprises a precision machined rod element, said rod element being secured in said groove of said shouldered element for defining said measurement surface and said measurement surface extending substantially normal to said rotation axis.

5. The gage of claim 4 wherein each shouldered element further comprises a rotation limiting element supported by said shouldered element for limiting the extent of rotational movement of said shouldered element.

6. The gage of claim 5 wherein said rotation limiting element comprises a pin member passing through, extending from, and fixed in position relative to said shouldered element.

7. The gage of claim 2 wherein said second group of finger means comprises a fixed and a said movable finger element for defining each second group measurement axis a predetermined distance from said respective stop means.

8. In a comparison gage for directly measuring the deviation in cross-sectional area of a passage from a nominal value, the gage having means for forming an enclosed hydraulic fluid chamber, at least a first and a second sensor piston slidably received in said chamber for displacing fluids therein according to the algebraic sum of the individual displacement of said pistons, said sensor pistons arranged for linear displacement in response to deviations from nominal values of respective dimensions of said passage along measurement axes, the ratio of the cross-sectional areas of said respective pistons being at least approximately equal to the inverse ratio of corresponding nominal dimensions of said passage along said measurement axes respectively, an output piston in fluid flow communication with said chamber for linear displacement in proportion to the displacement of fluid by said sensor pistons, a plurality of finger means, at least one finger means being movable along each of said measurement axes, means for supporting first and second groups of at least one each of said finger means so that each movable finger means is in driving relation with first and second groups of at least one each of said sensor pistons respectively, and said first and second groups of finger means being arranged to interiorly engage boundaries of a passage for substantially linear displacement along substantially perpendicular first and second groups of parallel measurement axes respectively, wherein the improvement comprises a plurality of stop positioning means, said stop means being arranged for engagement with said passage at a stable boundary thereof, and said second group of finger means comprises a finger means pair for engaging said passage along associated second group measurement axes at predetermined distances from said engaged passage boundary.

9. The comparison gage of claim 8 wherein said stop means comprises a plurality of fixed finger elements in juxtaposition to a plurality of respective movable finger elements.

10. The comparison gage of claim 9 wherein all said predetermined distances are equal.

11. In a comparison gage for directly measuring the deviation in cross-sectional area of a passage from a nominal value, the gage having means for forming an enclosed hydraulic fluid chamber, at least a first and a second sensor piston slidably received in said chamber for displacing fluids therein according to the algebraic sum of the individual displacement of said pistons, said sensor pistons arranged for linear displacement in response to deviations from nominal values of respective dimensions of said passage along measurement axes, the ratio of the cross-sectional areas of said respective pistons being at least approximately equal to the inverse ratio of corresponding nominal dimensions of said passage along said measurement axes respectively, an output piston in fluid flow communication with said chamber for linear displacement in proportion to the displacement of fluid by said sensor pistons, a plurality of finger means, at least one finger means being movable along each of said measurement axes, means for supporting first and second groups of at least one each of said finger means so that each movable finger means is in driving relation with first and second groups of at least one each of said sensor pistons respectively, and said first and second groups of finger means being arranged to interiorly engage boundaries of a passage for substantially linear displacement along substantially perpendicular first and second groups of parallel measurement axes respectively, wherein the improvement comprises at least one movable finger means of said first group of finger means comprising a rotating section, said rotating section being mounted for rotational movement about a section rotation axis substantially perpendicular to a measurement axis associated with said movable finger means, and each said rotating section has a supporting, cylindrically arranged, shouldered element, said shouldered element having arranged at a shouldered portion thereof a transversely extending groove for receiving a measurement member therein, the measurement member comprises a precision machined rod element, said rod element being secured in said groove of said shouldered element for defining a measurement surface and said measurement surface extending substantially normal to said rotation axis, and said measurement surface being aligned with and substantially intersecting said section rotation axis, whereby a center point of said measurement surface is substantially stationary as said shouldered element rotates, a plurality of first fixed finger elements arranged in juxtaposition to movable finger means, said finger elements being arranged for engagement with said passage at a boundary of said passage juxtaposed to the passage boundary in contact with said rotating measurement surfaces, and said second group of finger means comprising a fixed and a movable finger element for engaging said passage along associated second group measurement axes at selected distances from said respective first fixed finger elements.

* * * * *